(12) United States Patent
Haruna et al.

(10) Patent No.: US 7,092,045 B2
(45) Date of Patent: Aug. 15, 2006

(54) PROJECTION-TYPE DISPLAY APPARATUS

(75) Inventors: Fumio Haruna, Yokohama (JP);
Tsuneyuki Nozawa, Yokohama (JP);
Atsushi Shigeta, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 654 days.

(21) Appl. No.: 10/361,014

(22) Filed: Feb. 10, 2003

(65) Prior Publication Data
US 2004/0070694 A1    Apr. 15, 2004

(30) Foreign Application Priority Data
Oct. 9, 2002    (JP) .............................. 2002-295557

(51) Int. Cl.
 H04N 3/22    (2006.01)
 H04N 3/26    (2006.01)
 H04N 3/23    (2006.01)
(52) U.S. Cl. .................... 348/745; 348/746; 348/806; 353/70
(58) Field of Classification Search ........ 348/744–474, 348/657, 191, 805, 806; 353/69, 70, 101; 315/364, 370; H04N 3/22, 3/26, 3/23
See application file for complete search history.

(56) References Cited
U.S. PATENT DOCUMENTS 5,793,340 A * 8/1998 Morita et al. ................. 345/7
6,361,171 B1 * 3/2002 Ejiri et al. ..................... 353/69
6,481,855 B1 * 11/2002 Oehler ........................ 353/70
6,652,104 B1 * 11/2003 Nishida et al. ................ 353/70
6,686,973 B1 * 2/2004 Su .............................. 348/745
6,847,356 B1    1/2005 Hasegawa et al.

FOREIGN PATENT DOCUMENTS

JP       02835838       10/1998
JP       2000-122617    4/2000
JP       2001-109577    4/2001

* cited by examiner

Primary Examiner—Trang U. Tran
(74) Attorney, Agent, or Firm—McDermott Will & Emery LLP (57) ABSTRACT

In measuring the angle of inclination of a liquid crystal projector with respect to the screen for automatically adjusting a trapezoidal distortion, the calculation of the angle of inclination by determining the distance from the screen using a distance sensor conventionally requires a high distance measurement accuracy and hence an expensive distance sensor. According to the invention, a distance sensor is rotated and the level of the wave reflected from it is observed. The angle of inclination with respect to the screen is detected from the rotational angle associated with the maximum value of the level of the reflected wave thereby to correct the trapezoidal distortion. In this way, the trapezoidal distortion can be adjusted automatically using an inexpensive distance sensor.

15 Claims, 6 Drawing Sheets

PROJECTION-TYPE DISPLAY APPARATUS

BACKGROUND OF THE INVENTION

The present invention relates to a projection-type display apparatus such as a liquid crystal projector, or in particular to the correction of a trapezoidal distortion.

In recent years, conferences are often held for a presentation, in which the presentation data prepared in a personal computer are projected on a presentation screen in an enlarged form using a liquid crystal projector or the like without being distributed to attendants.

In an enlarged projection using a liquid crystal projector, the projection screen is generally displayed without any distortion when the image is projected from the front of the screen, i.e. from the direction perpendicular to the screen surface. In the case where the image is projected in a direction not perpendicular to the screen surface, on the other hand, the projection screen is displayed in distorted form. This distortion is generally called a trapezoidal distortion. The trapezoidal distortion is corrected by either an optical method or an electrical method. The optical method is not widely used as it is structurally limited and expensive. In the electrical method which is generally used now, on the other hand, the trapezoidal distortion is corrected by digitally processing the video signal and distorting the image reversely. In most cases using the electrical method, the user has so far manually adjusted the image while watching the distorted screen. However, a method for conducting the image adjustment automatically is reported (for example, JP-A-2000-122617).

According to the aforementioned patent publication, the trapezoidal distortion is automatically corrected by detecting the distance to the screen using a plurality of distance sensors and determining the angle of inclination between the screen and the display apparatus based on the result of detection.

SUMMARY OF THE INVENTION

The method described in the above-mentioned patent publication requires an accuracy of distance detection on the order of millimeters for detecting the angle of inclination with the screen.

Specifically, as shown in FIG. 2 of the same patent publication, assuming that the angle of inclination between the apparatus body and the screen is $\theta$ and the vertical width of the normal projection screen is d (corresponding to the distance between two assumed parallel light rays D1, D2 from two sensors), the relation $\tan \theta = (D1-D2)/d$ holds. From the shape of an ordinary liquid crystal projector, $d=300$ mm and $\theta=1$ degree are substituted into this equation. Then the relation is obtained that $$D1-D2 = d \times \tan \theta = 300 \times \tan 1° \approx 5.2 \ mm$$

This indicates that a distance sensor having a detection accuracy of at least about 5 mm is required for detecting the inclination angle of 1 degree. An inexpensive distance sensor such as an ultrasonic sensor or an infrared sensor has a detection accuracy of not more than about several cm at most. Under the circumstances, about the only sensor capable of detection with an accuracy on the order of millimeters is an expensive laser sensor which is not practicable.

The object of the present invention is to obviate the above-mentioned problems of the prior art and to provide a projection-type display apparatus in which the trapezoidal distortion is automatically adjusted using an inexpensive distance sensor.

In order to achieve the above-mentioned object, according to this invention, there is provided a projection-type display apparatus so configured that a distance sensor is rotated, the level of a reflected wave is observed, and the angle with the screen is detected from the rotational angle associated with the maximum value of the reflected wave level thereby to correct the trapezoidal distortion.

Other objects, features and advantages of the invention will become apparent from the following description of the embodiments of the invention taken in conjunction with the accompanying drawings.

DETAILED DESCRIPTION OF THE INVENTION

Figure 1:
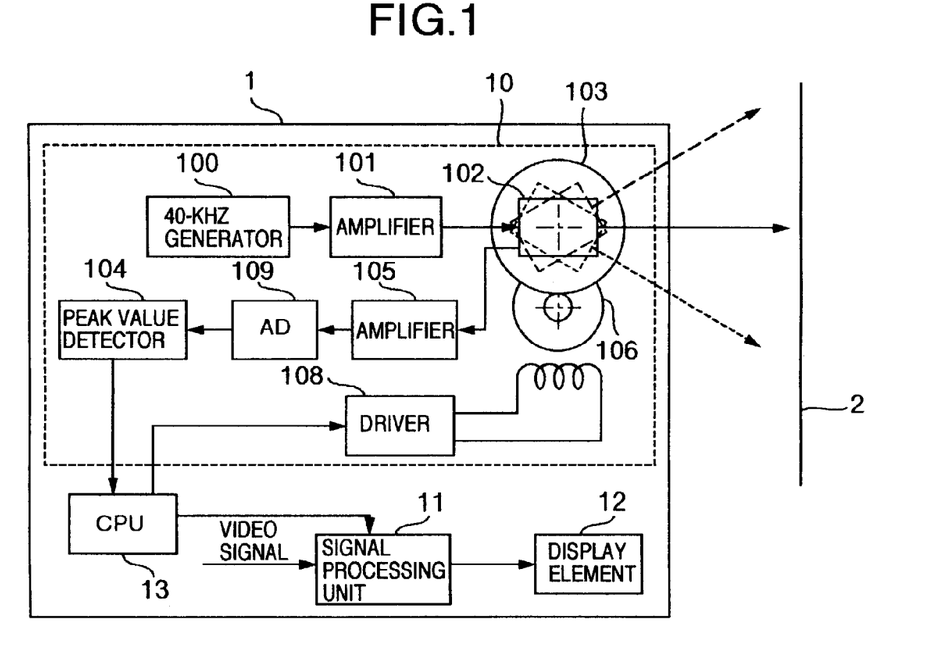
FIG. 1 is a block diagram showing a projection-type display apparatus according to a first embodiment of the invention.

A first embodiment of the invention is shown in FIG. 1. This embodiment employs an ultrasonic sensor as a distance sensor.

FIG. 1 is a block diagram showing a configuration according to the first embodiment of the invention comprising a projection-type display apparatus 1 such as a liquid crystal projector and a screen 2. The projection-type display apparatus 1 comprises a trapezoidal distortion correcting unit 10, a signal processing unit 11, a display element 12 and a CPU 13. The trapezoidal distortion correcting unit 10 includes a 40-kHz generating unit 100, a first amplifier 101, an ultrasonic sensor 102, a pedestal 103, a peak value detector 104, a second amplifier 105, a motor 106, a driver 108 and an AD unit 109.

Figure 2A:
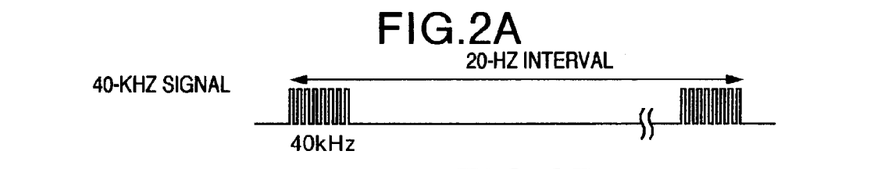
FIGS. 2A and 2B are timing charts for explaining the operation of the first embodiment.
Figure 2B:
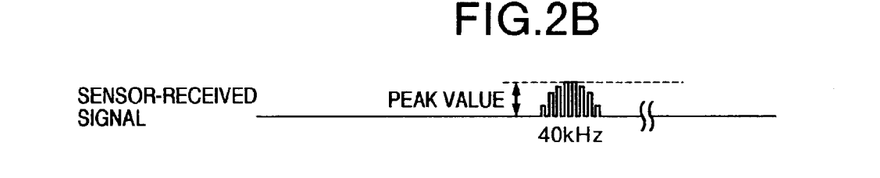

Next, the operation will be explained with reference to FIG. 1. The ultrasonic sensor 102 generally generates an ultrasonic wave upon application thereto of a pulse of 40 kHz and generates a pulse of 40 kHz upon receipt of an ultrasonic wave. A sensor exclusively used for transmission which generates only an ultrasonic wave or a sensor exclusively used for receiving an ultrasonic wave is also available. For the present case, however, the use of a sensor for both transmission and receiving is illustrated as an example. Pulses of 40 kHz are generated in the 40-kHz generator 100. Specifically, as in a waveform (1) shown in FIG. 2, pulses of 40 kHz are generated by intermittent oscillation at intervals of, say, 20 Hz. These pulses can be generated by combined use of a logic IC at the sacrifice of a larger circuit size. Therefore, the use of a programmable logic device (hereinafter referred to as the PLD) is recommended. The output of a device such as the logic IC or the PLD generally assumes the level of CMOS or TTL. On the other hand, the signal amplitude of the 40-kHz pulses input to the ultrasonic sensor 102 is required to be not less than several tens of Vpp. Therefore, the 40 kHz pulses are amplified by the first amplifier 101. For this purpose, a device such as a transformer or a transistor of high breakdown voltage is used. The ultrasonic sensor 102 generates an ultrasonic wave upon application thereto of 40-kHz pulses. The ultrasonic wave thus generated is transmitted out of the projection-type display apparatus 1 and received by the same ultrasonic sensor 102 after being reflected on the screen 2. In response to the ultrasonic wave thus received, the ultrasonic sensor 102 generates 40-kHz pulses. The amplitude of the 40-kHz pulses thus generated, however, is only about several to several tens of Vpp, and therefore these pulses are generated by the second amplifier 105. The 40-kHz pulses after amplification assume a waveform shown in FIG. 2B and are generated behind the pulses of the waveform shown in FIG. 2A. This delay corresponds to the time required for the return trip covering the distance to the screen 2. These 40-kHz pulses are subjected to the analog/digital conversion by the AD unit 109, after which the peak value of the level of the 40-kHz pulses of the waveform shown in FIG. 2B is determined by the peak value detector 104. Specifically, a logic for size comparison using a comparator and storing the peak value is set up by the PLD. The CPU 13 makes calculations by retrieving the particular peak value and generates a control signal for driving a motor. The detailed method of processing in the CPU 13 will be described later. The driver 108 supplies the motor 106 with a drive signal for rotating the motor based on the control signal from the CPU 13. The motor 106 rotates the ultrasonic sensor 102 by transmitting the rotation of the gear of the particular motor to the pedestal 103.

Figure 3:
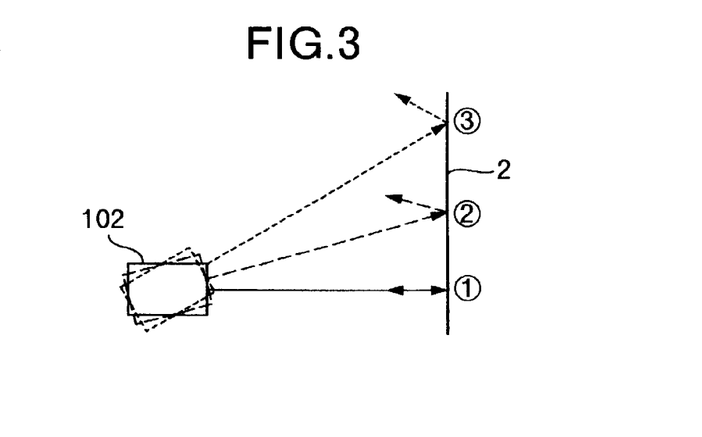
FIG. 3 is a diagram showing a configuration for explaining the operation of the first embodiment.
Figure 4:
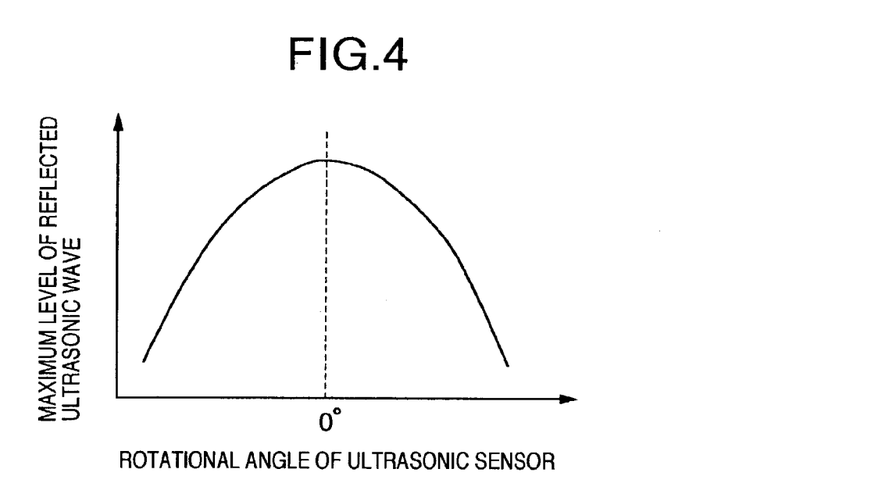
FIG. 4 is a diagram showing the angle characteristics for explaining the operation of the first embodiment.

FIG. 3 shows the reflection characteristic of the ultrasonic wave. In FIG. 3, (1) designates a case in which the ultrasonic sensor 102 is positioned in the direction perpendicular to the screen 2. At this time, the ultrasonic wave transmitted from the ultrasonic sensor 102 is returned after being reflected in the direction perpendicular to the screen 2. In FIG. 3, (2) shows a case in which the ultrasonic sensor 102 is positioned at a small angle with the direction perpendicular to the screen 2. In this case, the ultrasonic wave transmitted from the ultrasonic sensor 102 has some angle of incidence to the direction perpendicular to the screen 2, and therefore the amount of the wave reflected and returned to the ultrasonic sensor 102 decreases. The same can be said of case (3) as case (2) shown in FIG. 3. In case (3), the angle becomes larger than in case (2), and therefore the amount of the ultrasonic wave returned to the ultrasonic sensor 102 is further reduced. This relation is illustrated in FIG. 4. In FIG. 4, the abscissa represents the rotational angle of the ultrasonic sensor 102, and the ordinate the peak value of the level of the reflected ultrasonic wave, i.e. the output value of the peak value detector 104. The rotational angle with the ultrasonic sensor 102 positioned in the direction perpendicular to the screen 2 is assumed to be 0 degree and taken as a reference. Then, a curve shown in FIG. 4, is obtained which is parabolic about the rotational angle of 0 degree. As understood from this diagram, the level of the reflected ultrasonic wave becomes maximum in the case where the ultrasonic sensor 102 is positioned in the direction perpendicular to the screen 2.

Figure 5:
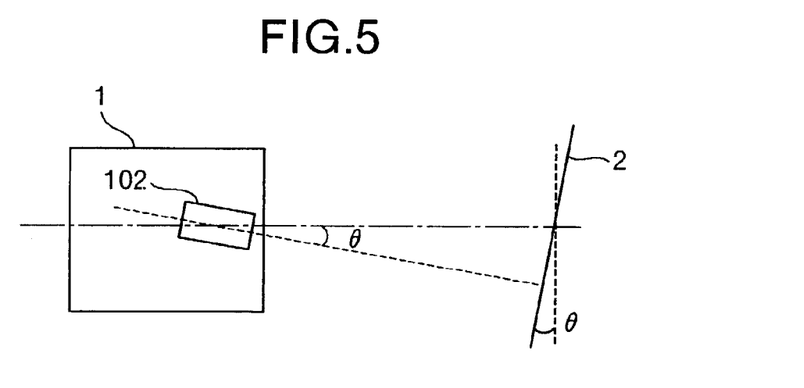
FIG. 5 is a diagram showing a configuration for explaining the operation of the first embodiment.
Figure 6:
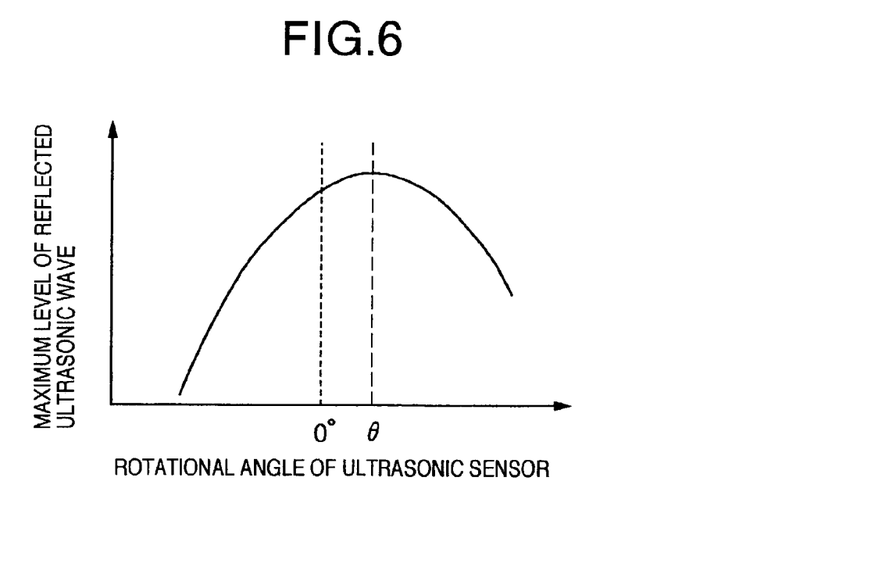
FIG. 6 is a diagram showing the angle characteristics for explaining the operation of the first embodiment.

By practical application of this characteristic, the relative angle between the projection-type display apparatus 1 and the screen 2 can be detected. Referring to FIG. 5, assume that the projection-type display apparatus 1 and the screen 1 are tilted by an angle θ relatively to each other. The ultrasonic sensor 102, when rotated by the angle θ with respect to the projection-type display apparatus 1, is positioned in the direction perpendicular to the screen 2. Under this condition, the relation between the rotational angle of the ultrasonic sensor 102 and the output value of the peak value detector 104 is given as shown in FIG. 6. This indicates that the level of the reflected ultrasonic wave becomes maximum for the rotational angle θ of the ultrasonic sensor 102, with the result that the relative angle between the projection-type display apparatus 1 and the screen 2 can be detected by determining the rotational angle associated with the maximum level of the reflected ultrasonic wave of the ultrasonic sensor 102.

Figure 7:
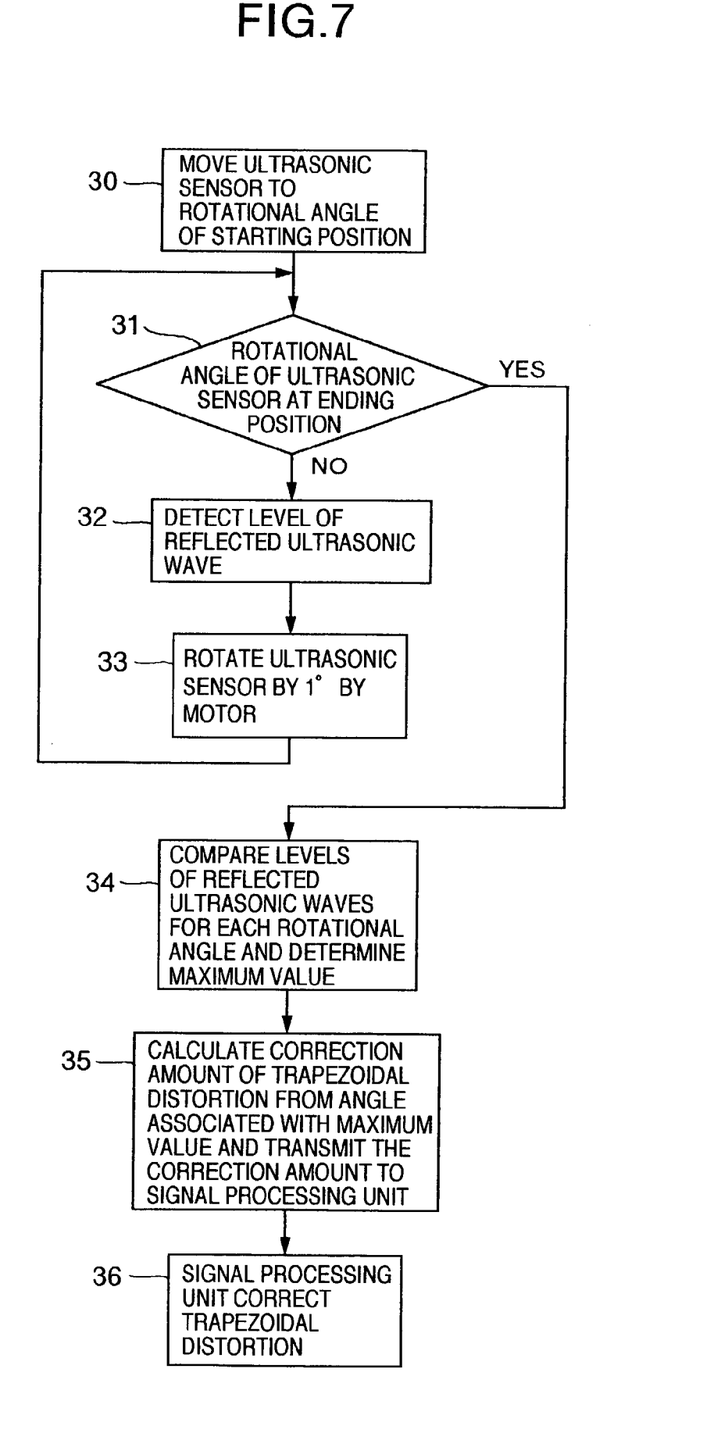
FIG. 7 is a flowchart for explaining the operation of the first embodiment.

Next, a detailed method of processing in the CPU 13 will be explained with reference to the flowchart of FIG. 7. As a prerequisite, assume that the ultrasonic sensor 102 is rotated one degree at a time from the starting position of −20 degrees to the ending position of +20 degrees with respect to the projection-type display apparatus 1. First, the motor 106 is rotated so that the ultrasonic sensor 102 assumes a starting position of −20 degrees (step 30). Next, it is determined whether the ultrasonic sensor 102 has reached the end position of +20 degrees. In the case where the ultrasonic sensor 102 has not reached the rotation end position of +20 degrees, the process proceeds to step 32, otherwise the process proceeds to step 34. Since the ultrasonic sensor 102 still stays at the rotation starting position, the process proceeds to step 32. In step 32, the level of the reflected ultrasonic wave output from the peak value detector 104 is retrieved. After that, the motor 106 is rotated to such an extent as to rotate the ultrasonic sensor 102 by one degree (step 33), and the process is returned to step 31. The process of steps 32 and 33 is repeated until the ultrasonic sensor 102 reaches the rotation ending position of +20 degrees. Once the rotation ending position is reached, the levels of the ultrasonic reflected wave from −20 to +20 degrees retrieved are compared with each other thereby to determine the rotational angle associated with the maximum level (step 34). From this rotational angle, the amount by which the trapezoidal distortion is to be corrected is calculated, and this correction amount is transmitted to the signal processing unit 11 (step 35). The signal processing unit 11 has a trapezoidal distortion correction processing circuit, in which the input video signal is digitally processed and a video signal having a trapezoidal distortion based on the correction amount is displayed on the display panel of the display element 12. By enlarged projection of this image, the trapezoidal distortion is corrected (step 36). These steps are processed in the CPU 13.

Figure 11:
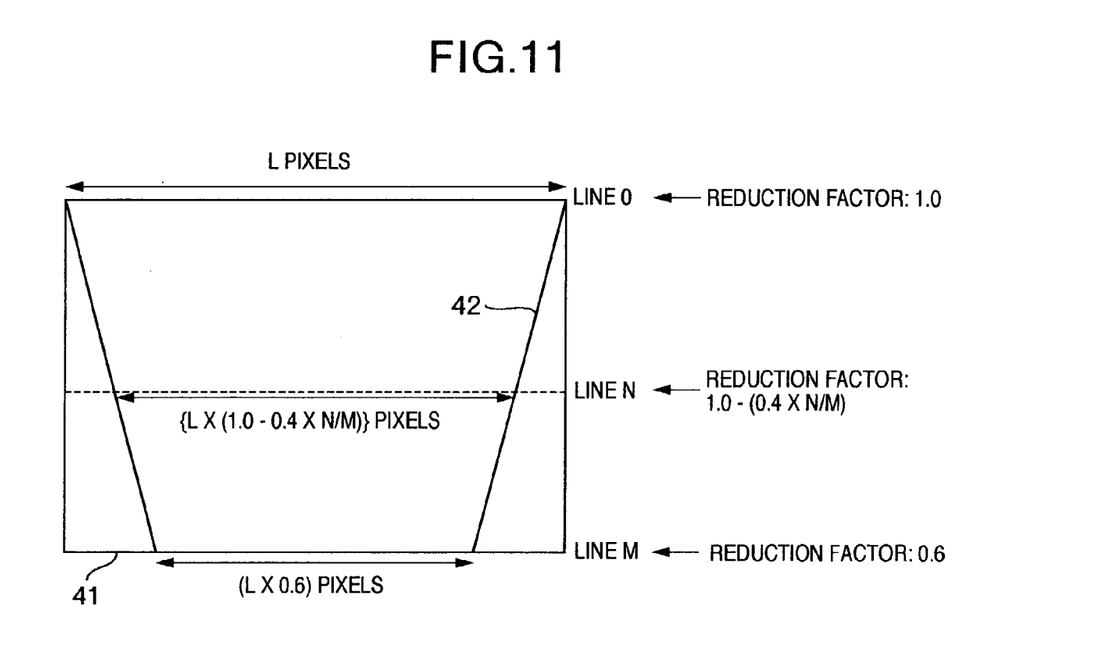
FIG. 11 is a schematic diagram for explaining the operation of a trapezoidal distortion correction processing circuit.

Now, the operation of the trapezoidal distortion correction processing circuit in the signal processing unit 11 will be explained with reference to FIG. 11. FIG. 11 shows a correction case in which the screen is tilted in vertical direction with respect to the optical axis of projection and the image is reduced progressively toward the upper part of the screen. FIG. 11 shows an area 41 on the image display element before trapezoidal distortion correction of the video signal and an area 42 on the image display element after trapezoidal distortion correction of the video signal, which represents the result of digital processing for trapezoidal distortion in vertical direction. As shown in FIG. 11, assume that the uppermost line of the screen is defined as line 0, the bottom line as line M, the intermediate line as line N, and the number of horizontal pixels before correction is L. For trapezoidal distortion, the digital processing is carried out in such a manner as to reduce the number of horizontal pixels progressively more toward the lowest line M. Assume, for example, that the trapezoidal distortion is corrected in such a manner that the reduction factor of line M is 0.6, i.e. the number of horizontal pixels on line M is L×0.6. Also, assume that the number of horizontal pixels is reduced linearly from the uppermost line 0 to the lowest line M of the screen. The reduction factor of intermediate line N is given as 1.0−(0.4×N/M), and the number of pixels can be calculated as L×(1.0−(0.4×N/M)). The trapezoidal distortion can be implemented by changing the number of horizontal pixels according to this calculation formula. The trapezoidal distortion can be carried out in similar manner in horizontal direction. It is thus obvious that the aforementioned process can be implemented by changing the reduction factor line by line.

Figure 12:
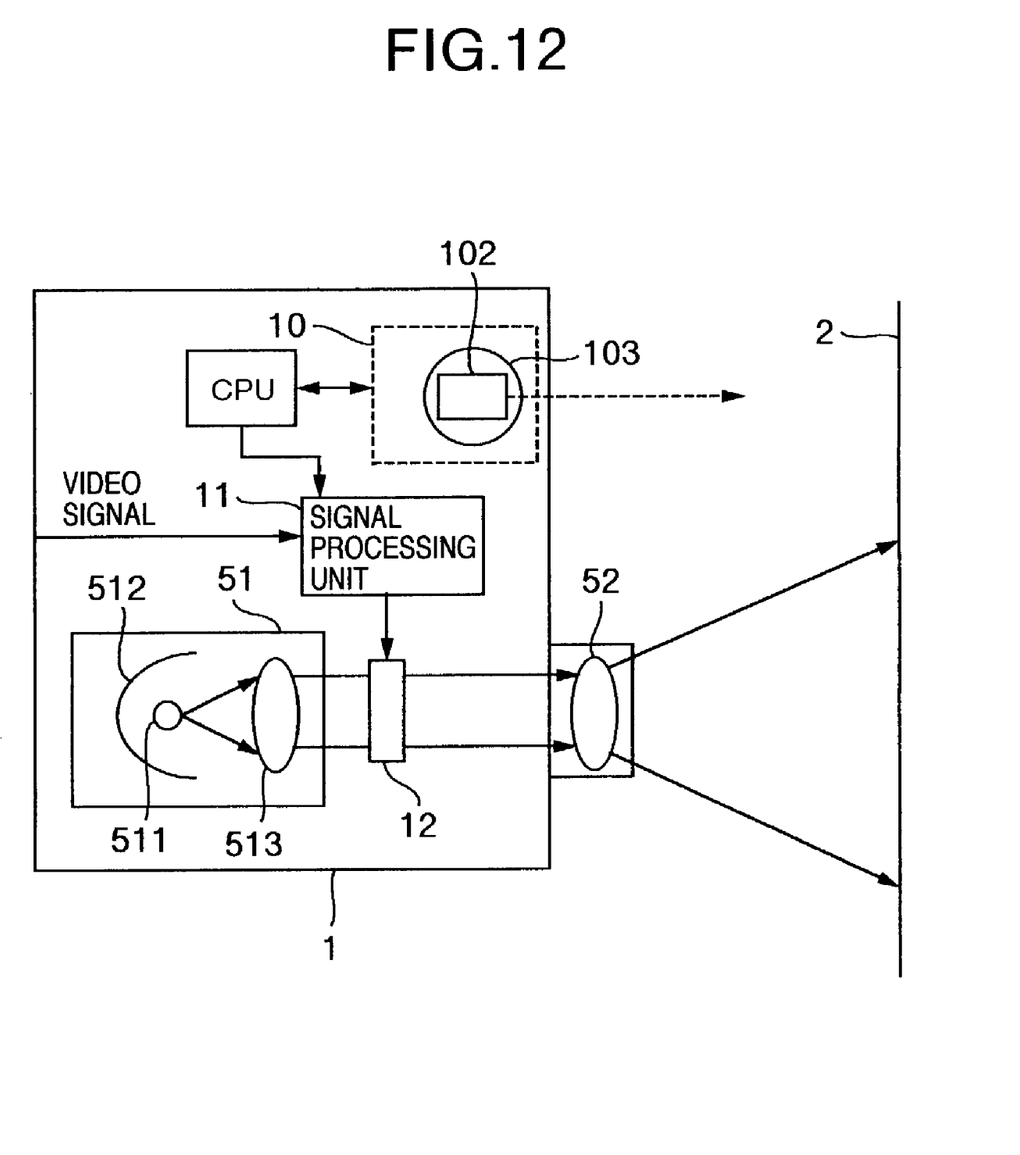
FIG. 12 is a diagram showing a configuration including an optical system according to this invention.

Next a configuration example including the optical system of the projection-type display apparatus 1 such as a liquid crystal projector will be additionally explained. FIG. 12 shows an example configuration including the optical system of the projection-type display apparatus 1. In FIG. 12, the component parts corresponding to those of FIG. 1 including the optical system of the projection-type display apparatus 1 are designated by the same reference numerals as the corresponding component parts in FIG. 1. The added component parts include an illumination optical system having a lamp 511, a reflector 512 and a condenser lens 513, and a projection lens 52 for projecting the image of the display element 12 on the screen 2. The light emitted from the lamp 511 and the reflector 512 is condensed by the condenser lens 513 and enters the display element 12. In response to this light, the image generated in the display element 12 enters the projection lens 52 and is projected on the screen 2. The ultrasonic sensor 102 may be arranged at any place where the ultrasonic wave is not shielded by the projection lens 52 when the ultrasonic sensor 102 is in rotation. Although the display element 12 shown in FIG. 12 was explained as a transmission type, it may alternatively be a reflection-type display element 12 configured of a corresponding illumination optical system 51. Also, the present invention is of course applicable even in the case where a multi-lens is used instead of the condenser lens 513.

As described above, the trapezoidal distortion can be corrected automatically by acquiring the level of the reflected ultrasonic wave for each angle the ultrasonic sensor is rotated and detecting the angle with respect to the screen from the rotational angle associated with the maximum level of the reflected wave.

In the embodiment described above, an explanation is given of a case in which an ultrasonic sensor is used as a distance sensor. Nevertheless, the present invention is not limited to such a sensor. For example, an infrared sensor or a laser sensor capable of generating a wave having a linear directivity has a similar characteristic with the reflected wave level reaching a maximum in the direction perpendicular to the screen surface and can be used with equal effect in this invention.

Figure 8:
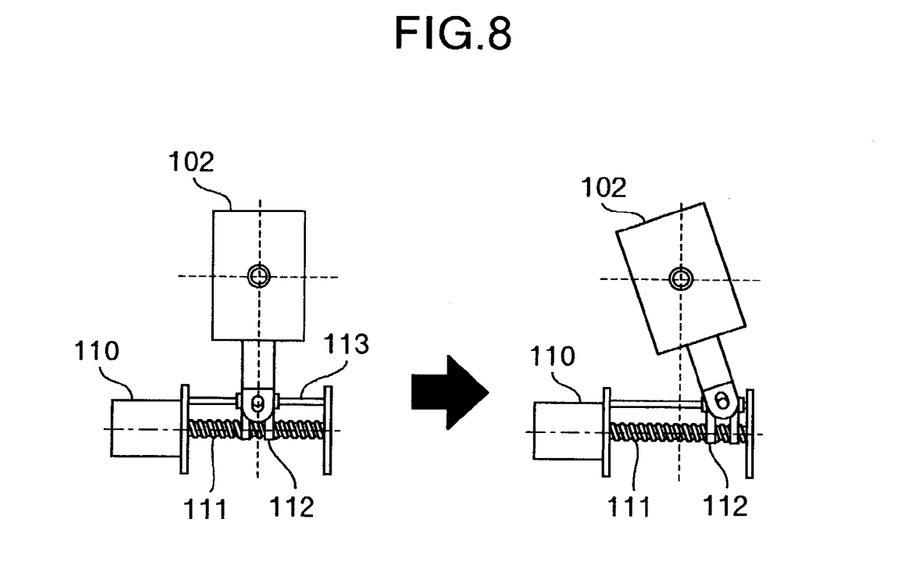
FIG. 8 is a diagram showing another configuration of a sensor rotating means.

Also, this invention is not limited to the method according to the aforementioned embodiment in which the pedestal 103 is rotated by the gear of the motor 106 to rotate the distance sensor. Instead, a method in which the distance sensor itself is rotated is applicable with equal effect. A structure in which a motor of lead screw type is used to convert the parallel motion due to the lead screw into the rotational motion is an example. Such an example is shown in FIG. 8. The structure shown in FIG. 8 includes an ultrasonic sensor 102, a motor 110, a lead screw 111, a slider 112 and a shaft 113. The operation with this structure will be explained. Upon rotation of the motor 110 and the lead screw 111, the slider 112 moves parallel along the shaft 113. This parallel motion is transmitted to the ultrasonic sensor 102. The ultrasonic sensor 102, which is fixed at the central position thereof, is rotated. In this way, a configuration in which the distance sensor itself rotates eliminates the need of a gear.

Figure 9:
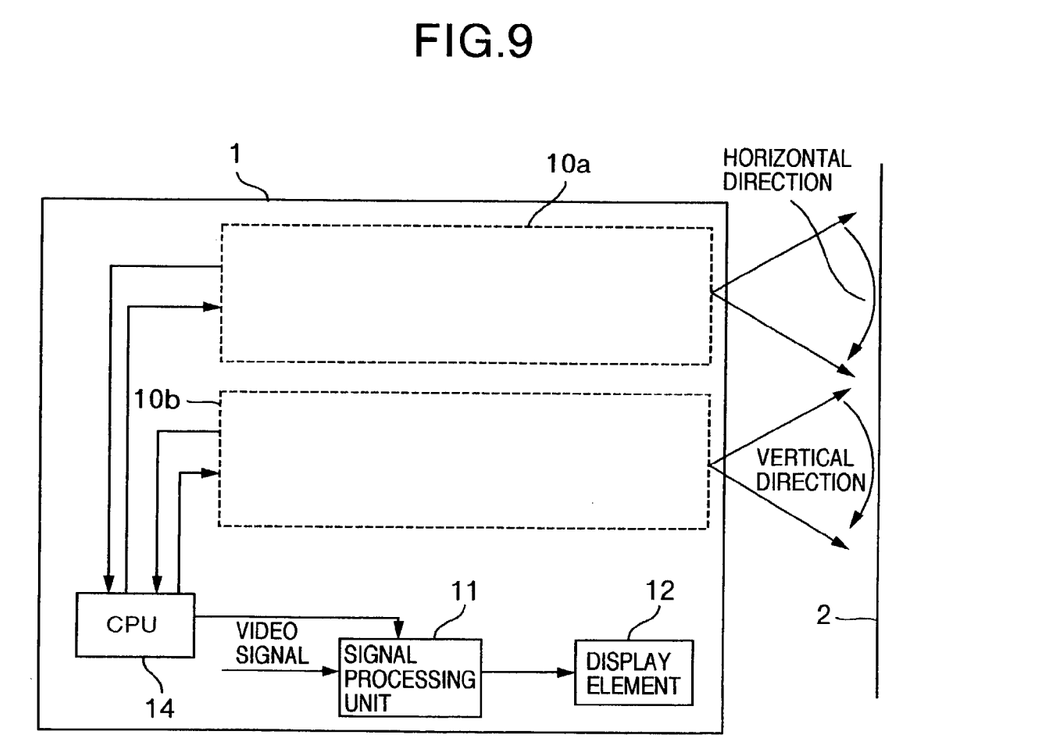
FIG. 9 is a block diagram showing a projection-type display apparatus according to a second embodiment of the invention.

A second embodiment of the invention is shown in FIG. 9. The feature of this embodiment lies in that two distance sensors are used and each of them is rotated separately in the direction horizontal and vertical with respect to the projection-type display apparatus. In this way, both the horizontal and vertical trapezoidal distortions with respect to the screen can be corrected.

FIG. 9 is a diagram showing a configuration according to a second embodiment of the invention, in which the component parts corresponding to those shown in the configuration example of FIG. 1 according to the first embodiment are designated by the same reference numerals, respectively. The difference of this embodiment from the first embodiment lies in a CPU 14 and the use of two blocks (trapezoidal distortion correcting units 10a, 10b) identical to the trapezoidal distortion correcting unit 10 of FIG. 1. The other parts of the configuration are identical to the corresponding ones of the first embodiment and will not be described again.

The ultrasonic sensor 102 in the trapezoidal distortion correcting unit 10a is arranged in such a manner as to rotate horizontally with respect to the projection-type display apparatus 1 at its installed position, while the ultrasonic sensor 102 in the trapezoidal distortion correcting unit 10b is arranged in such a manner as to rotate vertically with respect to he projection-type display apparatus 1 at its installed position. The trapezoidal distortion correcting units 10a, 10b operate the same way except that the rotational direction thereof with respect to the projection-type display apparatus 1 is different.

Thus, the CPU 14 can detect the angle of inclination in horizontal direction with respect to the screen 2 from the level of the reflected ultrasonic wave acquired by the trapezoidal distortion correcting unit 10a, and the angle of inclination in vertical direction with respect to the screen 2 from the level of the reflected ultrasonic wave acquired by the trapezoidal distortion correcting unit 10b. Based on this detection result, the CPU 14 transmits the amounts of trapezoidal distortion correction in both horizontal and vertical directions to the signal processing unit 11. The signal processing unit 11, upon receipt of these correction amounts, digitally processes the input video signal and corrects both horizontal and vertical trapezoidal distortions.

Next, a third embodiment of the invention will be explained. The configuration of this embodiment is identical with that of the first embodiment. The difference lies in the method of calculating the angle of inclination by the CPU 13.

Figure 10:
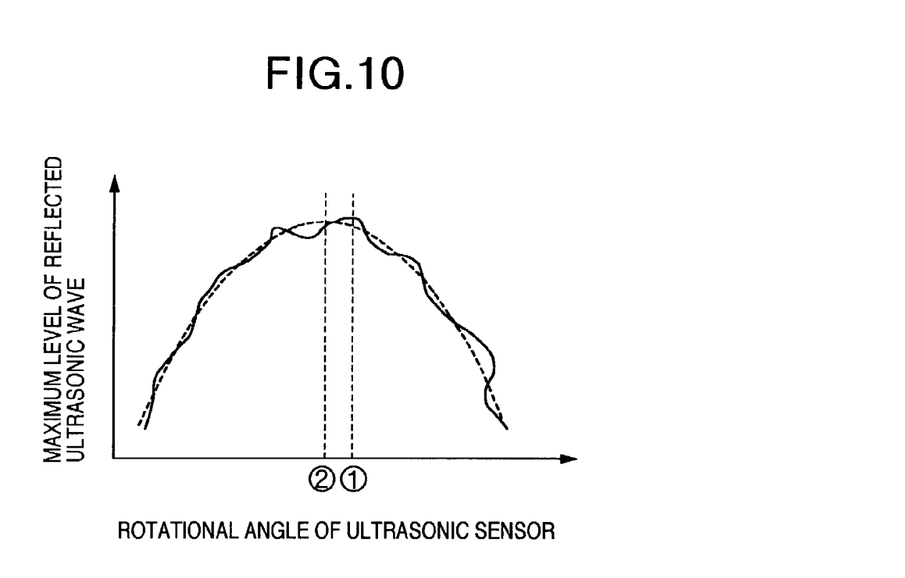
FIG. 10 is a diagram showing the angle characteristics for explaining the operation of the projection-type display apparatus according to a third embodiment of the invention.

The method of calculation will be explained with reference to FIG. 10. The ultrasonic wave is generally easily affected by the environmental conditions such as wind. Therefore, the level of the reflected ultrasonic wave rarely assumes a purely parabolic form as shown in FIG. 4, but a noise component is added as indicated by solid line in FIG. 10. With this curve, the angle associated with the maximum value is indicated by (1) in FIG. 10. This angle (1), at which the level of the reflected wave may be probably increased by noises, however, is often different from the original rotational angle at which the ultrasonic sensor 102 and the screen 2 are orthogonal to each other. In view of this, an approximate expression is determined from the data string of the reflected ultrasonic wave levels acquired by the CPU 13, as indicated by dotted line in FIG. 10. This approximate expression assumes the maximum value for the angle (2). An example of the approximate expression is the one obtained by the least squares method. By determining an approximate expression in this way, the noise component can be reduced. Also, the CPU 13 controls the signal processing unit 11 by determining the rotational angle of the ultrasonic sensor associated with the maximum value of the approximate expression.

As described above, an approximate expression is determined for the level of the reflected ultrasonic wave acquired, so that the noise component can be reduced for an improved accuracy with which the amount of the trapezoidal distortion is corrected.

Apart from the effect of the environmental conditions on the ultrasonic wave described above in this embodiment, the infrared light is affected similarly.

The trapezoidal distortion may be corrected alternatively at the time of switching on the power supply of the image display apparatus, in which case the correcting operation may be performed by depressing an exclusive switch such as an automatic setup switch for changing the input terminal upon adjustment of the display position or detection of an input signal. Further, this invention is applicable with equal effect in the case where the operation of correcting the trapezoidal distortion is performed upon detection of the movement of the image display apparatus according to the change amount of the output from the ultrasonic sensor, for example.

As described above, according to this invention, the trapezoidal distortion can be automatically adjusted by detecting the angle of inclination between the liquid crystal projector and the screen using an inexpensive distance sensor.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A projection-type display apparatus for projecting an input video signal in enlarged form on a screen, comprising:
    a sensor which radiates a selected one of an ultrasonic wave and light on said screen and receives said selected one of said ultrasonic wave and said light reflected from said screen;
    a rotator which rotates said sensor;
    a detector which detects the level of said received signal;
    a relative angle detector which detects a relative angle between said projection-type display apparatus and said screen based on a rotational angle of said sensor at which the level of said received signal is substantially maximum;
    a trapezoidal distortion corrective circuit which corrects the trapezoidal distortion of said video signal based on the relative angle; and
    a projector;
    wherein the video signal processed for correction of the trapezoidal distortion is projected on said screen.

2. A projection-type display apparatus according to claim 1,
    wherein said rotator rotates said sensor in a horizontal direction with respect to said projection-type display apparatus.

3. A projection-type display apparatus according to claim 1, comprising two of said sensors and two of said rotators,
    wherein said rotators are so configured as to rotate said sensors in horizontal and vertical directions, respectively, with respect to said projection-type display apparatus.

4. A projection-type display apparatus for projecting an input video signal in enlarged form on a screen, comprising:
    a sensor which radiates a selected one of an ultrasonic wave and light on said screen and receives said selected one of said ultrasonic wave and said light reflected from said screen;
    a rotator which rotates said sensor by a predetermined angle each time;
    a detector which detects a peak value of said received signal for each rotational angle;
    a trapezoidal distortion corrective circuit controlled based on the result of detection from said peak value detector; and
    a projector;
    wherein said trapezoidal distortion corrective circuit determines a maximum peak angle whose peak value is a maximum value of the peak values for the respective rotational angles, to calculate an angle of inclination between said projection-type display apparatus and said screen, for correction of the trapezoidal distortion due to said angle of inclination.

5. A projection-type display apparatus according to claim 4,
    wherein said peak value detector is so configured that an approximate expression is calculated from said received signal for each rotational angle and the maximum value of said approximate expression is employed as the peak value.

6. A projection-type display apparatus according to claim 5,
    wherein said rotator rotates said sensor in a horizontal direction with respect to said projection-type display apparatus.

7. A projection-type display apparatus according to claim 5, comprising two of said sensors and two of said rotators,
    wherein said rotators are so configured as to rotate said sensors in horizontal and vertical directions, respectively, with respect to said projection-type display apparatus.

8. A projection-type display apparatus according to claim 4,
    wherein said rotator rotates said sensor in a horizontal direction with respect to said projection-type display apparatus.

9. A projection-type display apparatus according to claim 4, comprising two of said sensors and two of said rotators,
wherein said rotators are so configured as to rotate said sensors in horizontal and vertical directions, respectively, with respect to said projection-type display apparatus.

10. A projection-type display apparatus for projecting an input video signal in enlarged form on a screen, comprising:
a sensor which radiates a selected one of an ultrasonic wave and light on said screen and receives said selected one of said ultrasonic wave and said light reflected from said screen;
a rotator which rotates said sensor by a predetermined angle each time;
a peak value detector which detects the peak value of said received signal for each rotational angle;
a trapezoidal distortion corrective circuit which controls said video signal based on the result of detection from said peak value detector;
an image display element which forms an optical image in accordance with the video signal processed for correction of the trapezoidal distortion; and
a projection means which projects said optical image,
wherein said trapezoidal distortion corrective circuit determines a maximum peak angle whose peak value is a maximum value of the peak values for the respective rotational angles, to calculate an angle of inclination between said projection-type display apparatus and said screen, for correction of the trapezoidal distortion due to said angle of inclination.

11. A projection-type display apparatus according to claim 10,
wherein said peak value detector is so configured that an approximate expression is calculated from said received signal for each rotational angle and the maximum value of said approximate expression is employed as the peak value.

12. A projection-type display apparatus according to claim 11,
wherein said rotator rotates said sensor in a horizontal direction with respect to said projection-type display apparatus.

13. A projection-type display apparatus according to claim 11, comprising two of said sensors and two of said rotators,
wherein said rotators are so configured as to rotate said sensors in horizontal and vertical directions, respectively, with respect to said projection-type display apparatus.

14. A projection-type display apparatus according to claim 10,
wherein said rotator rotates said sensor in a horizontal direction with respect to said projection-type display apparatus.

15. A projection-type display apparatus according to claim 10, comprising two of said sensors and two of said rotators,
wherein said rotators are so configured as to rotate said sensors in horizontal and vertical directions, respectively, with respect to said projection-type display apparatus.

* * * * *